United States Patent
Hessedenz

(10) Patent No.: US 8,126,755 B2
(45) Date of Patent: Feb. 28, 2012

(54) SYSTEMS AND METHODS FOR AUTOMATED PARALLELIZATION OF DEPLOYMENT

(75) Inventor: Hans-Juergen Hessedenz, Saarwellingen (DE)

(73) Assignee: SAP AG, Walldorf (DE)

(*) Notice: Subject to any disclaimer, the term of this patent is extended or adjusted under 35 U.S.C. 154(b) by 1500 days.

(21) Appl. No.: 11/190,914

(22) Filed: Jul. 28, 2005

(65) Prior Publication Data
US 2007/0027737 A1  Feb. 1, 2007

(51) Int. Cl.
*G06Q 10/00* (2006.01)
(52) U.S. Cl. .................... 705/7.12; 705/7.11; 705/28
(58) Field of Classification Search ............... 705/7.11, 705/7.12, 28; 709/102, 100, 202; 701/201
See application file for complete search history.

(56) References Cited

U.S. PATENT DOCUMENTS

| | | | | |
|---|---|---|---|---|
| 5,797,113 | A * | 8/1998 | Kambe et al. ............... 701/201 |
| 6,529,934 | B1 * | 3/2003 | Kawamura et al. ........... 718/102 |
| 6,801,901 | B1 * | 10/2004 | Ng ................................. 705/28 |
| 6,889,197 | B2 * | 5/2005 | Lidow ........................... 705/10 |
| 7,243,074 | B1 * | 7/2007 | Pennisi, Jr. ..................... 705/8 |
| 7,430,610 | B2 * | 9/2008 | Pace et al. .................... 709/233 |
| 2002/0019759 | A1 * | 2/2002 | Arunapuram et al. ........... 705/7 |
| 2003/0140111 | A1 * | 7/2003 | Pace et al. .................... 709/214 |
| 2004/0172344 | A1 * | 9/2004 | Stockwell et al. ............. 705/28 |
| 2006/0059005 | A1 * | 3/2006 | Horn et al. ...................... 705/1 |
| 2006/0059059 | A1 * | 3/2006 | Horn et al. ..................... 705/35 |
| 2006/0059060 | A1 * | 3/2006 | Horn et al. ..................... 705/35 |

FOREIGN PATENT DOCUMENTS

WO  WO 00/68859  *  5/2000

OTHER PUBLICATIONS

User's Guide to ROADNET 5000. Routing & Scheduling System, Version 5.6. United Parcel Service Company, Roadnet Technologies, Inc., 1996 Timonium, MD.*
SCM APO 4.0 Training Course in Supply Network Planning. Unit 10:Transport Load Builder. IBM Corporation, 2005.*
Rodrigue, Jean-Paul. Parallel Distributed Processing of Transportation/Land Use Systems: Theory and Modelling with Neural Networks. Transportation Research C, 1997, vol. 5, No. 5, pp. 259-271.*
Kolmeier, Mertens, Zeier: Supply Chain Management Based on SAP Systems, Springer 2002, pp. 137-149.
Transport Load Builder, SAP Supply Chain Management (SAP SCM) Release 4.0, Jul. 2004.

* cited by examiner

*Primary Examiner* — Jonathan G Sterrett
*Assistant Examiner* — Stephanie Zagarella
(74) *Attorney, Agent, or Firm* — Finnegan, Henderson, Farabow, Garrett & Dunner LLP

(57) ABSTRACT

Systems and methods are provided for creating a distribution plan for one or more products from a source location to a destination location. In one exemplary embodiment, the systems and methods may include defining a parallel processing profile to be associated with the distribution plan, and determining whether the parallel processing profile is specified prior to creating the distribution plan. If the profile is determined to be specified, one or more packages may then be built of the one or more products. Building one or more packages may comprise building a location products table of one or more location products. The location products table may specify the name, location, and deployment information of each of the one or more location products. The one or more location products may be selected for each package based on the deployment information. The distribution plan for each package of the one or more products may then be determined.

38 Claims, 14 Drawing Sheets

| Source location | Destination location | Stock transfer order or planned order) |
| --- | --- | --- |
| DC1 | CU1 | 50 |
| DC2 | CU1 | 50 |
| PL1 | DC1 | 50 |
| PL1 | DC2 | 25 |
| PL2 | DC2 | 25 |
|  | PL2 (planned order) | 25 |
|  | PL1 (planned orders) | 75 |

| Location | Product | Low Level Code | |
|---|---|---|---|
| PL1 1002 | MAT1 1004 | 2 | Package 1 1091 |
| PL2 1008 | MAT1 1010 | 2 | |
| DC1 1014 | MAT1 1016 | 1 | |
| DC2 1020 | MAT1 1022 | 1 | |
| CU1 1026 | MAT1 1028 | 0 | |
| PL1 1032 | MAT2 1034 | 2 | Package 2 1092 |
| PL2 1038 | MAT2 1040 | 2 | |
| DC1 1044 | MAT2 1046 | 1 | |
| DC2 1050 | MAT2 1052 | 1 | |
| CU1 1056 | MAT2 1058 | 0 | |
| PL1 1062 | MAT3 1064 | 2 | Package 3 1093 |
| PL2 1068 | MAT3 1070 | 2 | |
| DC1 1074 | MAT3 1076 | 1 | |
| DC2 1080 | MAT3 1082 | 1 | |
| CU1 1086 | MAT3 1088 | 0 | |

| Location | Product | Low Level Code | |
|---|---|---|---|
| DC2 1102 | MAT1 1104 | 1 | Package 4 1137 |
| CU1 1108 | MAT1 1110 | 0 | |
| DC2 1114 | MAT2 1116 | 1 | Package 5 1138 |
| CU1 1120 | MAT2 1122 | 0 | |
| DC2 1126 | MAT3 1128 | 1 | Package 6 1139 |
| CU1 1132 | MAT3 1134 | 0 | |

FIG. 11

SYSTEMS AND METHODS FOR AUTOMATED PARALLELIZATION OF DEPLOYMENT

BACKGROUND OF THE INVENTION

I. Field of the Invention

The present invention generally relates to data processing and deployment systems and methods. More particularly, the invention relates to computerized systems and methods for automated parallelization of deployment in a supply chain environment.

II. Background Information

In a supply chain management (SCM) environment, Supply Network Planning (SNP) typically integrates the purchasing, manufacturing, distribution, and transportation of products so that comprehensive tactical planning and sourcing decisions can be simulated and implemented on the basis of a single, global consistent model. SNP, which may be implemented using software or computerized applications, uses advanced optimization techniques, based on constraints and penalties, to plan product flow along the supply chain. The result is optimal purchasing, production, and distribution decisions, reduced-order fulfillment times and inventory levels, and improved customer service.

Starting from a demand plan, SNP determines a permissible short-to medium-term plan for fulfilling the estimated sales volumes. This plan covers both the quantities that must be transported between locations (for example, a distribution center to a customer or a production plant to a distribution center), and the quantities to be produced and procured. When making a recommendation, SNP may compare all logistical activities to the available capacity.

Within SNP, a deployment application is often provided that calculates the quantity of products available to deploy from source locations to destination locations. The deployment application may determine how and when inventory should be deployed to distribution centers, customers, and vendor-managed inventory accounts. It produces optimized distribution plans based on constraints (such as transportation capacities) and business rules (such as minimum cost approach or replenishment strategies). A deployment application may create a distribution plan for one product at one location.

Currently, technology is available to help create distribution plans for products within a supply chain environment. However, existing deployment applications suffer from several drawbacks. One problem is that conventional deployment applications only deploy one product at a time from a source location to a destination location. As a result, a deployment application may have to run several times in order to deploy several products, even if the products are in the same source location. This leads to very long processing or run times as the products are processed successively.

Furthermore, in some existing deployment applications, a user may manually group the products into various packages and then start a deployment process for each of the packages at the same time. However, this often leads to severe errors in distribution. For example, if two processes were started for two packages, and each package contained the same product, a lock-up would occur with the processes if the quantity of the products in the packages exceeded the available quantity of the products.

Accordingly, there is a need for improved systems and methods for automatically and more efficiently process deployment runs, such as deployment runs in a supply chain environment.

SUMMARY OF THE INVENTION

Methods, systems, and articles of manufacture consistent with the present invention may create a distribution plan for one or more products from a source location to a destination location. More particularly, methods, systems, and articles of manufacture consistent with the invention facilitate the automated parallelization of the deployment for one or more products in a deployment application, for example, in a supply chain management system.

One exemplary embodiment of the invention relates to a method for creating a distribution plan for one or more products, each product being represented by a location product. The method may include: providing a parallel processing profile to be associated with the distribution plan. The method may also comprise building one or more packages of the one or more location products, wherein building one or more packages comprises providing a table of the one or more location products, the table comprising deployment information associated with each of the one or more location products. Further, the method may include selecting the one or more location products for each package based on the deployment information and the parallel processing profile, and generating the distribution plan for each package.

Another exemplary embodiment of the invention relates to a distribution system. The distribution system may include a processor and a memory configured to perform a method for creating a distribution plan for one or more products from a source location to a destination location. The method may include: defining a parallel processing profile to be associated with the distribution plan, and determining whether the profile is specified prior to creating the distribution plan. If the profile is determined to be specified, the method may include building a plurality of packages of the one or more location products, wherein building the plurality of packages comprises providing a table of the one or more location products, the table comprising deployment information associated with each of the one or more location products. Further, the method may include selecting one or more location products for each package based on the deployment information and the parallel processing profile, and generating the distribution plan for each package.

Another exemplary embodiment of the invention relates to a computer-readable medium which stores a set of instructions which when executed performs a method for creating a distribution plan for one or more products each product being represented by a location product. The method may comprise defining a parallel processing profile to be associated with the distribution plan, and building one or more packages of the one or more location products. Building one or more packages may comprise storing in memory a plurality of location products representative of the products to be deployed, storing in memory deployment information associated with each location product. Further, the method may include selecting one or more location products for each package based on the deployment information, and generating the distribution plan for each package of the one or more location products.

Additional aspects of the invention are set forth in the detailed description that follows or may be learned by practice of methods, systems, and articles of manufacture consistent with the present invention. It is understood that both the foregoing general description and the following detailed description are exemplary and explanatory only, and are not restrictive of the invention as claimed.

BRIEF DESCRIPTION OF THE DRAWINGS

The accompanying drawings, which are incorporated in and constitute a part of this specification, illustrate several aspects of the invention and, together with the description, serve to explain the principles of the invention. In the drawings:

FIGS. 2A and 2B illustrate an exemplary block diagram and table for determining the available deploy quantity before deploying products to a warehouse;

FIG. 10 is an exemplary products table, consistent with an embodiment of the present invention; and FIG. 11 is another exemplary products table, consistent with an embodiment of the present invention.

DETAILED DESCRIPTION

Figure 1:
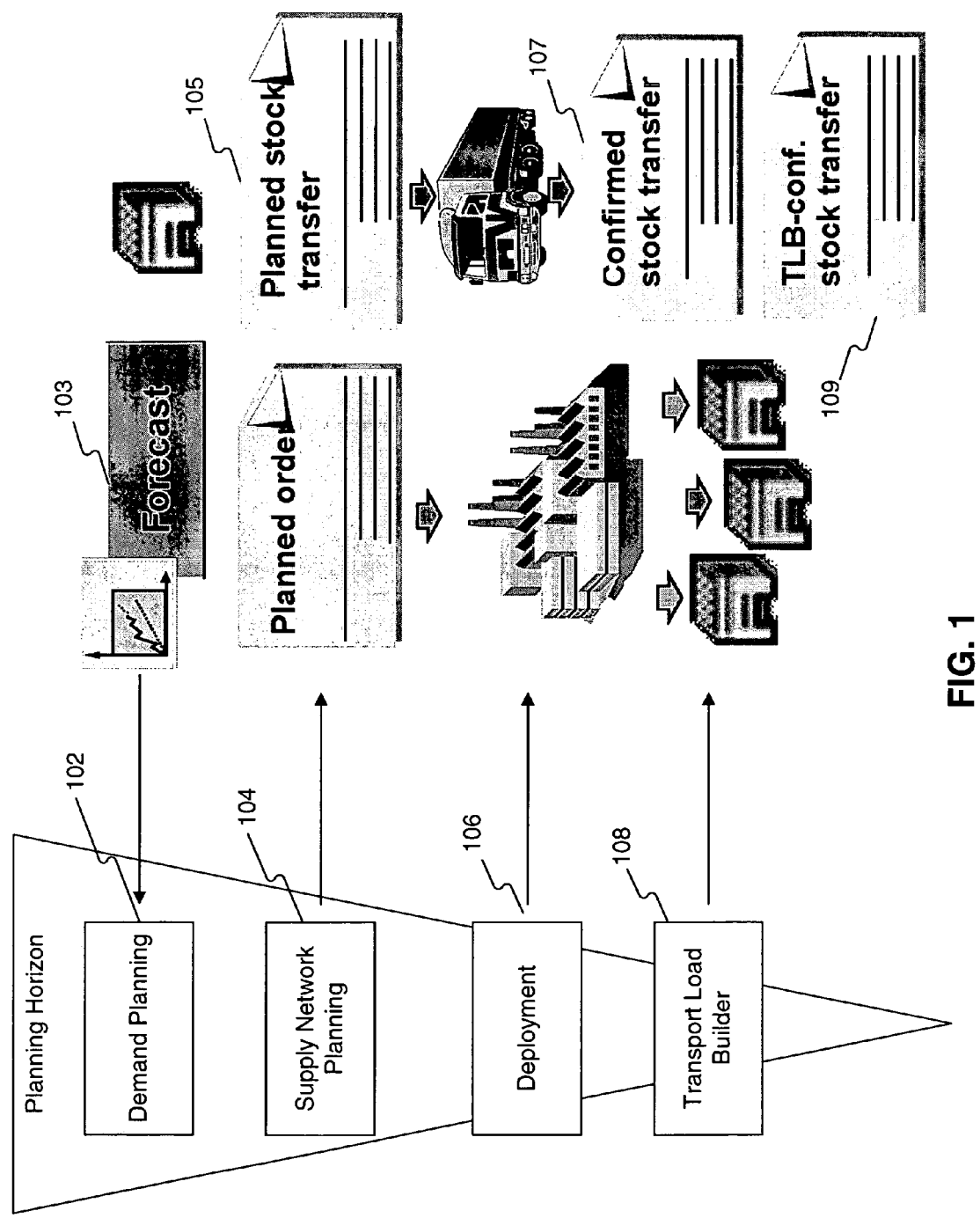
FIG. 1 illustrates an exemplary environment for implementing embodiments of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations, and other implementations are possible, without departing from the spirit and scope of the invention. For example, substitutions, additions, or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

FIG. 1 illustrates an exemplary environment for implementing embodiments, consistent with the present invention. In the example of FIG. 1, an SCM environment is presented. An initial step in an SCM environment may be Demand Planning 102 for a given planning horizon (e.g., one or more months). In Demand Planning 102, a system may data mine historical data to forecast 103 future demand of products by customers. Once the Demand Planning 102 has occurred, SNP 104 may occur. SNP 104 integrates purchasing, manufacturing, distribution, and transportation so that comprehensive planning and sourcing decisions can be simulated and implemented on the basis of a single model. SNP 104 may use optimization techniques to plan product flow along the supply chain. For example, starting with the demand plan received from Demand Planning 102, SNP 104 may determine a short- to medium-term plan for fulfilling the estimated sales volumes and create planned stock transfer orders 105. This plan may cover both the quantities that must be transported between locations and the quantities to be produced and/or procured.

Deployment 106 may then determine how and when a product should be deployed to distribution centers. As will be appreciated by those skilled in the art, embodiments of the present invention are not limited to distribution centers, but will be referred to only for illustrating exemplary embodiments consistent with the present invention. Inventory may also be deployed to customers and/or vendor-managed inventory accounts. Deployment 106 may include using a module or system to produce plans based on constraints (such as transportation capacities) and business rules (such as minimum cost approach or replenishment strategies). Deployment 106 is discussed further below with regard to FIGS. 2-11 and the aspects of the present invention presented herein.

Deployment 106 may generate deployment stock transfer orders 107 that serve as a basis for a Transport Load Builder (TLB) 108. TLB 108 may utilize a module or system to group transport loads for various means of transport. By way of example, TLB 108 may group deployment stock transfers that were generated by deployment 106 into TLB 108 confirmed stock transfers 109, which are then sent to a warehouse or elsewhere for processing.

As used herein, the term "deployment" refers to a planning process that determines which demands can be fulfilled by the existing supply, after production is complete. If the produced quantities match the quantities planned prior to deployment in SNP planning, the result of the deployment is a confirmation of the SNP plan. If the available quantities are not sufficient to fulfill the demand, or if these quantities exceed the demand, the system makes appropriate changes. Deployment generates deployment stock transfers that serve as a basis for a transportation load builder application.

Embodiments of the invention may be implemented for determining the deployment of stock, products, materials, parts, and the like. For purposes of illustration, embodiments of the invention are described herein with reference to a location product. The term "location product," as used herein, refers to an object that represents a product, such as a product assigned to a specific location within a supply chain. A location product may include one or more attributes, such as product name, a product location, and a low level code. A location product may be representative of one unit of any set of units, such as a palette or other grouping of more than one unit. In the later case, the number of units in that palette can be indicated by an attribute of the location product. As used herein, a "product" refers to goods that are subject of a business activity. A product may be used, consumed, or created in the course of a product process and may be finished goods, stock parts, or material used in the production cycle.

Further, as used herein, a "low level code" is refers to a code or other data to describe where a location product is located within a supply chain. The low level code may used to determine a sequence order for deployment. Alternative embodiments for providing deployment information are also possible. For example, a priority code or other indicia indicating the sequence order may be used. In one exemplary embodiment, a location product with a higher low level code than that of another location product is processed first when determining the deployment of the products.

Figure 2A:
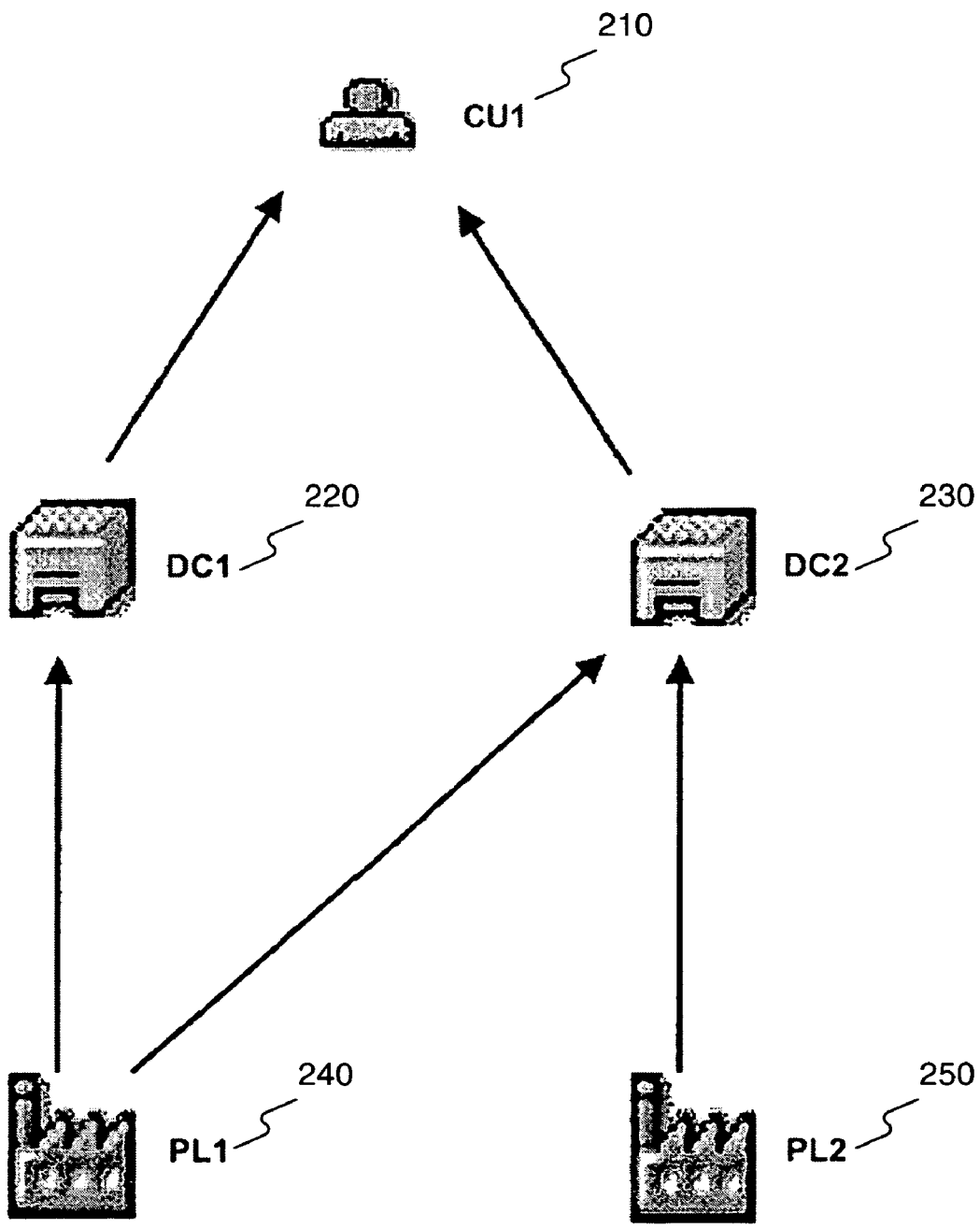

For purposes of illustration, FIGS. 2A and 2B provide an exemplary block diagram and table related to a deployment process; in this case, determining the available deploy quantity before deploying products to a warehouse. Before deployment (e.g., deployment 106) is carried out for a location product, the available to deploy (ATD) quantity of location products may be determined. In a supply chain, the flow of material may normally be from a plant to a distribution center and then from the distribution center to one or more customer locations. Thus, deployment may have to be carried out in a correct sequence, so that stock transfer orders with a location product are already confirmed as being available, before deployment is started for the location product.

In the example shown in FIG. 2A, if a forecast of "100" units exists for a customer 210 and for all incoming lanes from the distribution centers (DC1 220, DC2 230) a 50% deployment rate is maintained, a deployment process may generate the table shown in FIG. 2B. If the quantity for a planned order from plant PL2 250 is for 25 units, and from plant PL1 240 is 75 units, then from plant PL2 to distribution center DC2 230 and from plant PL1 to distribution center DC2, a stock transfer order for "25" units may be created, and from plant PL1 to distribution center DC1 220 a stock transfer order for "50" units may be created. From distribution center DC2 230 to customer CU1 210 and from distribution center DC1 220 to customer CU1, a stock transfer order for "50" units may be created. If deployment was started for the distribution centers first, the quantity from the planned order on the plants would not be transferred to the distribution centers and the available quantity would be zero.

Figure 3:
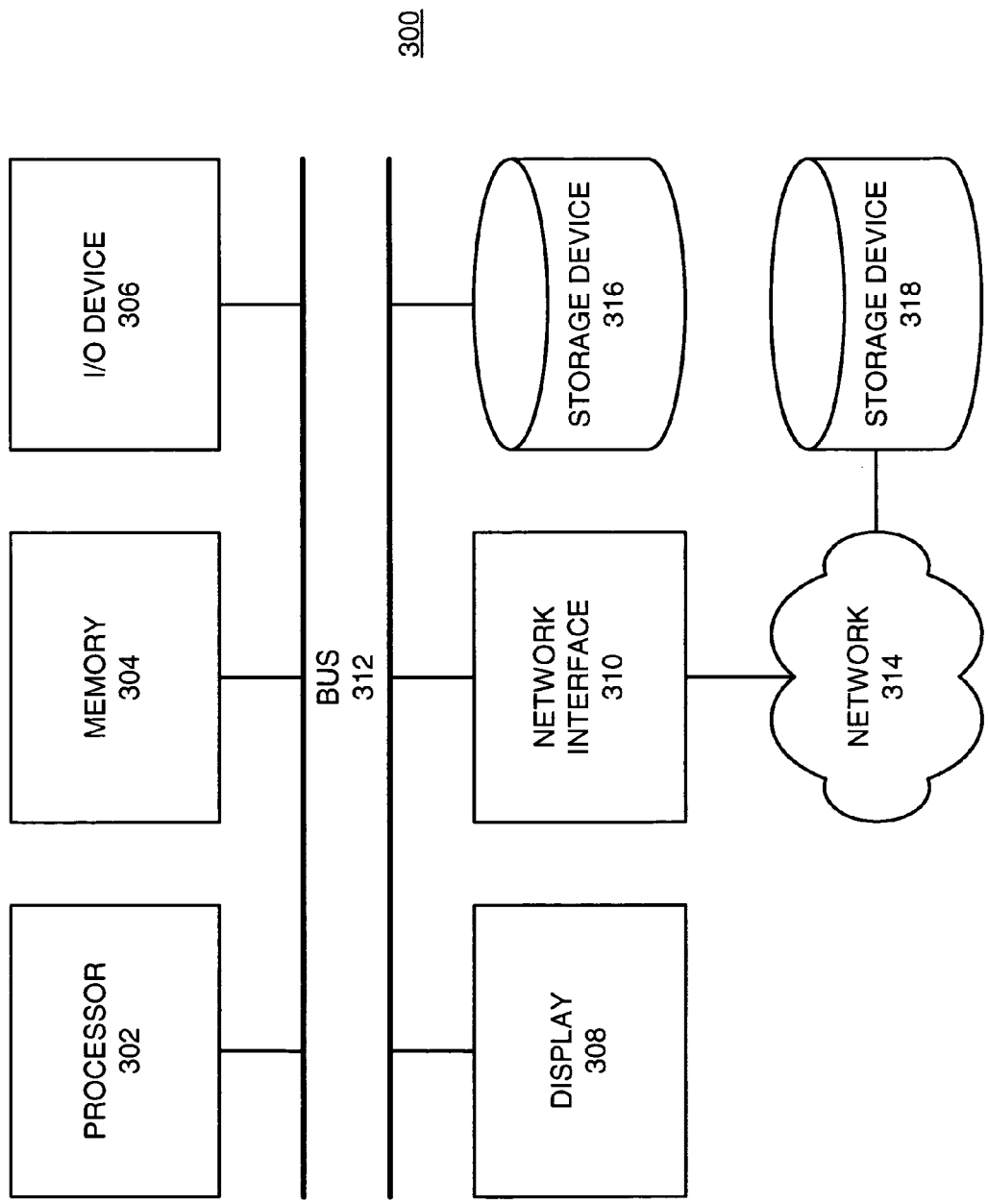
FIG. 3 illustrates an exemplary SNP system, consistent with an embodiment of the present invention.

In one exemplary embodiment consistent with the present invention, purchasing, manufacturing, distribution, and transportation in a supply chain may be monitored and controlled using a SNP system, such as the exemplary SNP system 300 illustrated in FIG. 3. SNP system 300 may include a processor 302, a memory 304, an input/output (I/O) device 306, a display 308, a network interface 310, a bus 312, a network 314, and one or more persistent storage devices 316 and 318. Processor 302, memory 304, I/O device 306, display 308, network interface 310, and storage device 316 may be configured to communicate over bus 312. Storage device 316 and network interface 310 may be configured to communicate over network 314. In one exemplary embodiment, SNP system 300 or components thereof may be incorporated into a planning system, such as the Advanced Planning Optimizer (APO) available from SAP AG (Walldorf, Germany).

In the example of FIG. 3, processor 302 may include a mainframe, a laptop, a personal computer, a workstation, a computer chip, a digital signal processor board, an analog computer, a plurality of processors, or any other information processing device or combination of devices. Further, processor 302 may be implemented by a general purpose computer or data processor selectively activated or reconfigured by a stored computer program, or may be a specially constructed computing platform for carrying out the features and operations disclosed herein. Memory 304 may include random access memory (RAM), read-only memory (ROM), flash memory, or any other information storage device. I/O device 306 may include a keyboard, a mouse, a trackball, a light pen, an electronic tablet, or any other mechanism to communicate input or output data with SNP system 300. Display 308 may include a cathode-ray-tube monitor, a plasma screen, a liquid-crystal-display screen, or any other device to display or otherwise convey information from SNP system 300.

Network interface 310 may include an Ethernet card, an FDDI card, a modem, or any other mechanism for interfacing to a network. Bus 312 may include a data cable, a circuit board connection, a fiber optic line, a network, a serial connection, a parallel connection, or any other mechanism for conveying information between processor 302, memory 304, I/O device 306, display 308, network interface 310, and/or storage device 316. Network 314 may include a local area network, a wide area network, an intranet, an Extranet, the Internet, a telephone network, a wireless network, a wired network, and/or any other means for communicating between locations.

Storage devices 316 and 318 may include a hard drive, a tape drive, a RAID disk array, a database system, an optical disk drive, and/or any other device or system that persistently stores information. A database in storage devices 316 and 318 may store various types of data, including enterprise-wide data such as master data and transactional data. As disclosed herein, data stored in a database may represent objects and may be used during processing. Master data may include, for example, data pertaining to product, location, location product, transportation lane, etc. Transactional data may include, for example, data pertaining to inventory, orders (including stock or product transfer orders), sales, etc. The above-noted items are merely examples and, as will be appreciated by those skilled in the art, other types of data may be stored in the database according to the needs of the user and/or the SNP system.

In one exemplary embodiment consistent with the present invention, memory 304 may store one or more software applications or modules that provide one or more deployment processes that may be executed in parallel to automatically create distribution plans for products located in one or more locations of a supply chain environment. Memory 304 may also include a package-building process that is adapted to group the products into packages processed by the parallel deployment processes.

Figure 4:
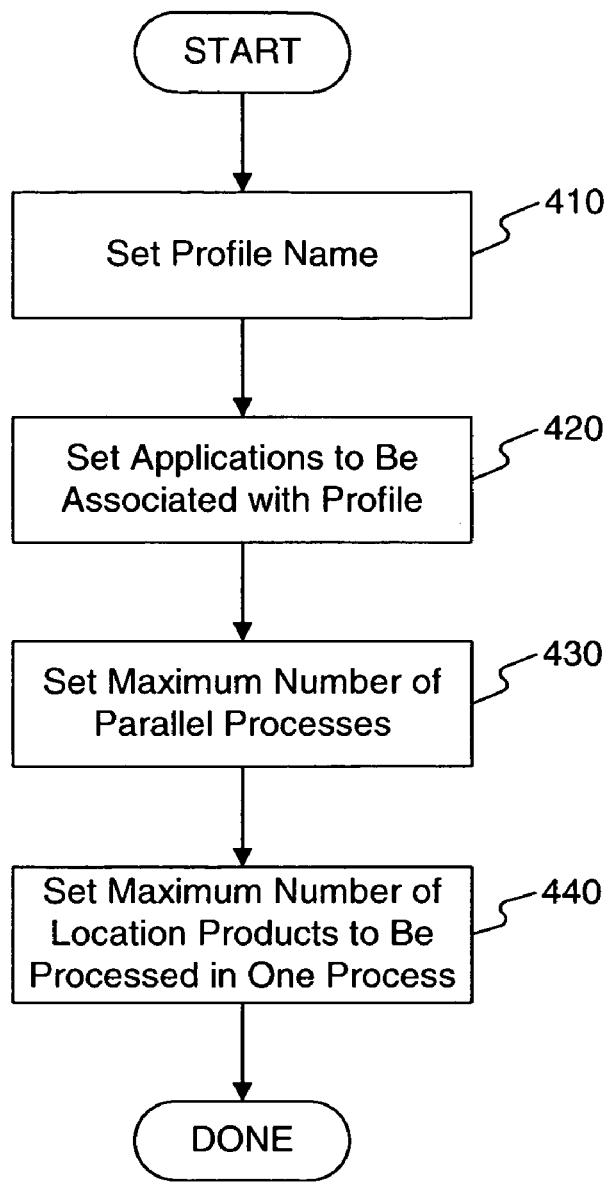
FIG. 4 is a flowchart of an exemplary method for creating a parallel processing profile, consistent with an embodiment of the present invention.

FIG. 4 is a flowchart of an exemplary method for creating a parallel processing profile (PPP), consistent with an embodiment of the present invention. For purposes of illustration, the flowchart of FIG. 4 is described with reference to the exemplary SNP system 300, as depicted in FIG. 3. It will be appreciated, however, by those skilled in the art that the method of FIG. 4 is not limited to use with SNP system 300 and may be used in other planning environments, consistent with the present invention.

A user may first designate a profile name to be associated with the PPP (stage 410). This may be achieved through a GUI (see, e.g., FIG. 5) or other input means. Once the user has designated a profile name, the user may then set the application(s) to be associated with the profile (stage 420). For example, a user may associate a profile with a deployment application or other planning application(s). The user may then determine the number of parallel deployment processes to be associated with the profile (stage 430). In one embodiment, this number represents the number of deployment processes that may be executed at the same time by SNP system 300. As will be appreciated by those skilled in the art, use of the PPP is not limited to deployment processes, but will be referred to only for illustrating exemplary embodiments consistent with the present invention. The PPP, for example, can also be used for other processes within the SNP system 300.

Once the maximum number of parallel processes has been defined, the user may then set the maximum number of location products to be processed in one process, i.e., the package size (stage 440). In one embodiment, SNP system 300 may create a distribution plan that determines how and when inventory should be deployed to distribution centers and/or customers using the maximum number of parallel processes (defined in stage 430) and the package size (defined in stage 440). The profile may then be saved, such as in storage device 316 (cf. FIG. 3).

To create a PPP, one or more user interfaces may be provided. Such an interface may include, for example, entry fields and control buttons for entering information. In one embodiment, a GUI is provided with message prompts, entry fields and/or control buttons to facilitate the creation of planning PPPs by a user. Such a GUI may comprise one or more screens or windows to guide a user through the process of creating a PPP. Help screens may provide information for the user, and/or drop-down menus or tables may provide lists of predefined services, profiles or other elements for selection by the user when creating a PPP. Additionally, or alternatively, PPPs may be created using a separate application or program and then stored for later access by the SNP system 300.

Figure 5:
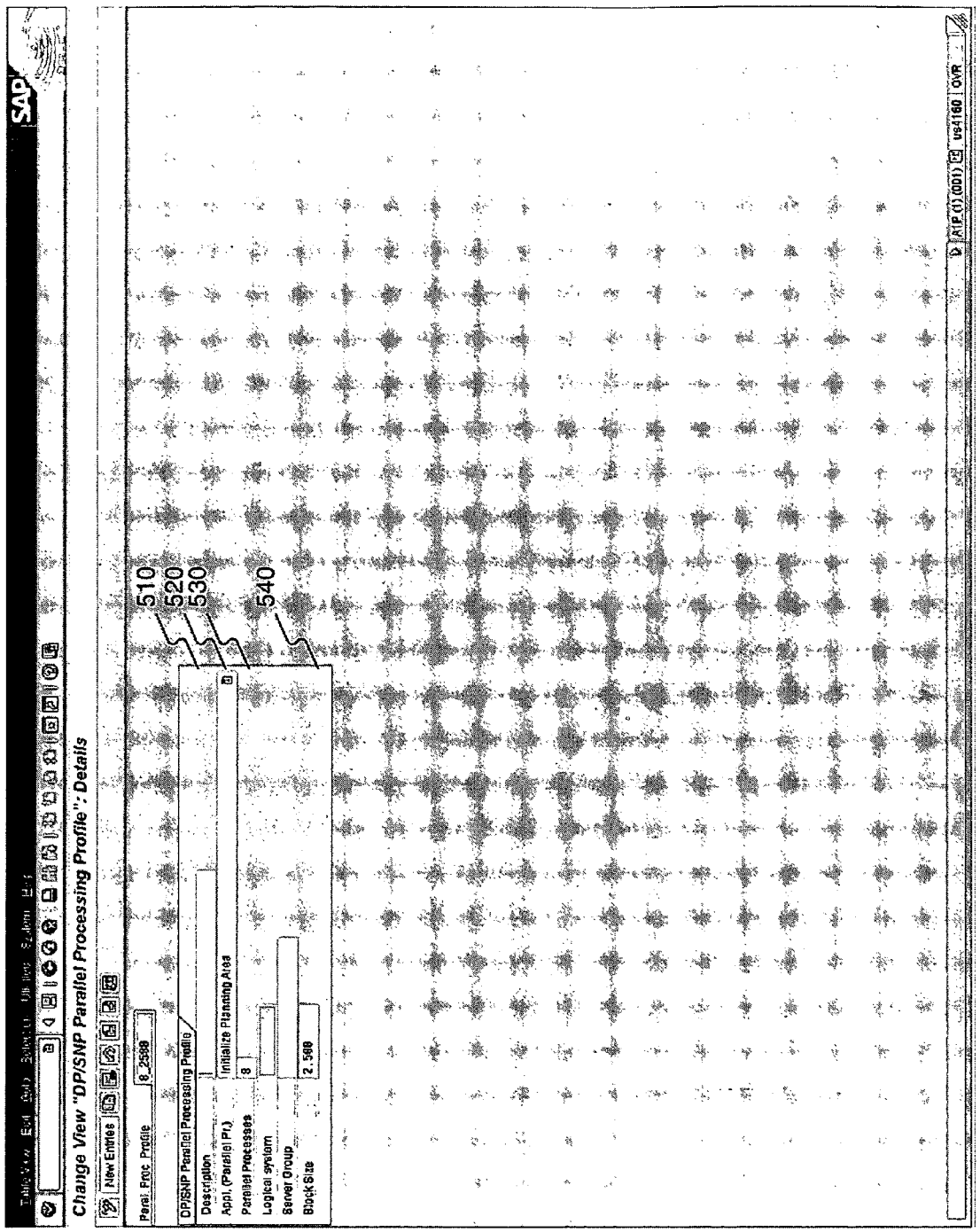
FIG. 5 is an exemplary graphical user interface (GUI) that may be used to define a parallel processing profile.

FIG. 5 is an exemplary graphical user interface (GUI) used to define a PPP. As described in FIG. 4, the user may designate a profile name (510), and set the application(s) to be associated with the profile (520). The user may also determine the number of parallel processes to be associated with the profile (530) and set the maximum number of location products to be processed in one process (540).

Figure 6:
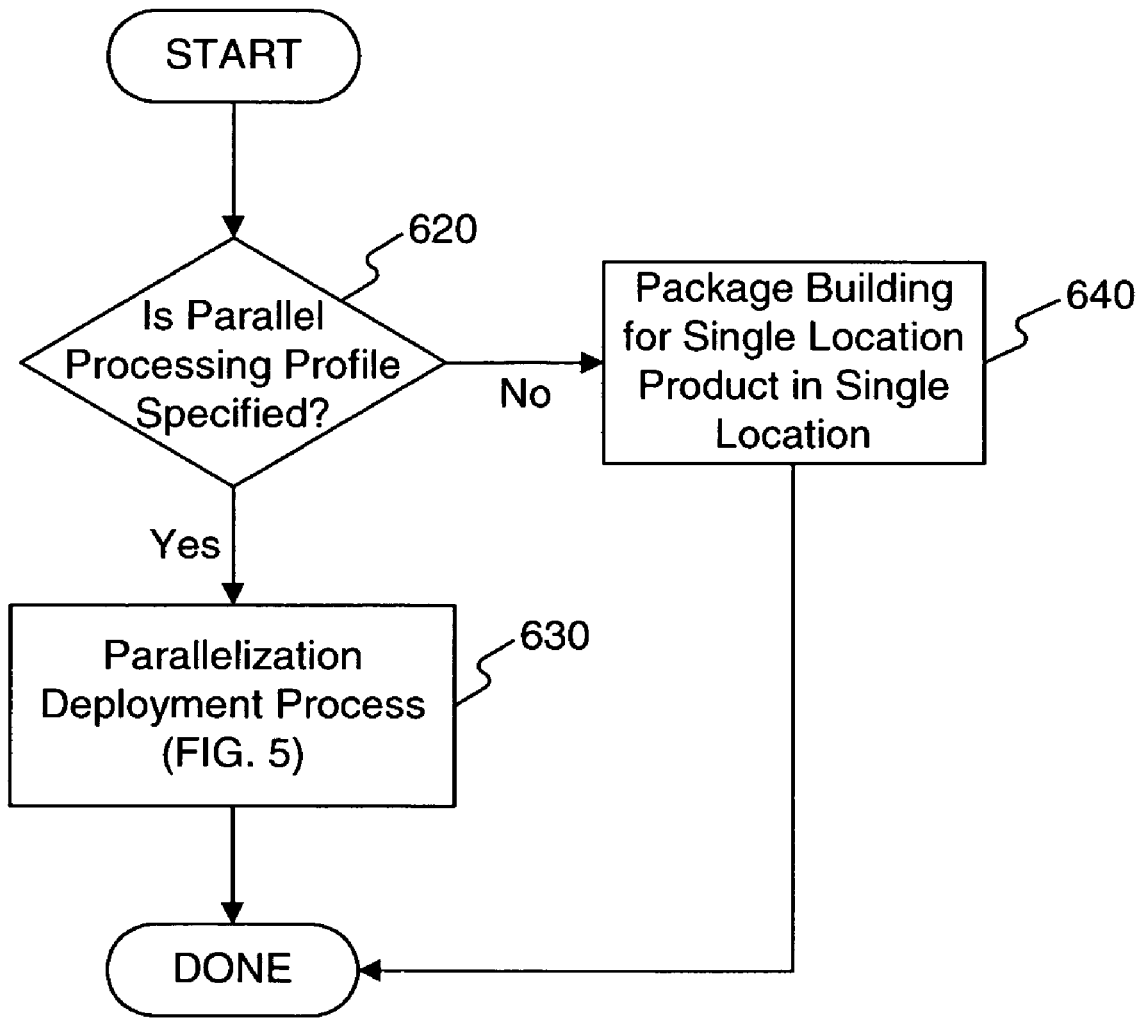
FIG. 6 is a flowchart of an exemplary parallelization deployment process, consistent with an embodiment of the present invention.

FIG. 6 is a flowchart of an exemplary parallelization deployment process, consistent with an embodiment of the present invention. The example of FIG. 6 is described with reference to the exemplary embodiment of SNP system 300 as depicted in FIG. 3. However, other system environments may also be used to implement the exemplary method of FIG. 6.

Referring to FIG. 6, SNP system 300, before creating a distribution plan, may first determine whether a PPP was specified by a user of SNP system 300 (stage 620). SNP system 300 may determine whether a profile is specified by determining whether the user has selected a profile name of a previously created profile. If a PPP was specified, SNP system 300 may then execute a parallelization deployment process (stage 630). Exemplary embodiments of a parallelization deployment process are discussed further below with regard to FIGS. 8 and 9A-9C. If a PPP was not specified, no parallelization is carried out and the selected location products are processed successively. The SNP system 300 may, therefore, execute a deployment process for a single location product at a single location (stage 640).

Figure 7:
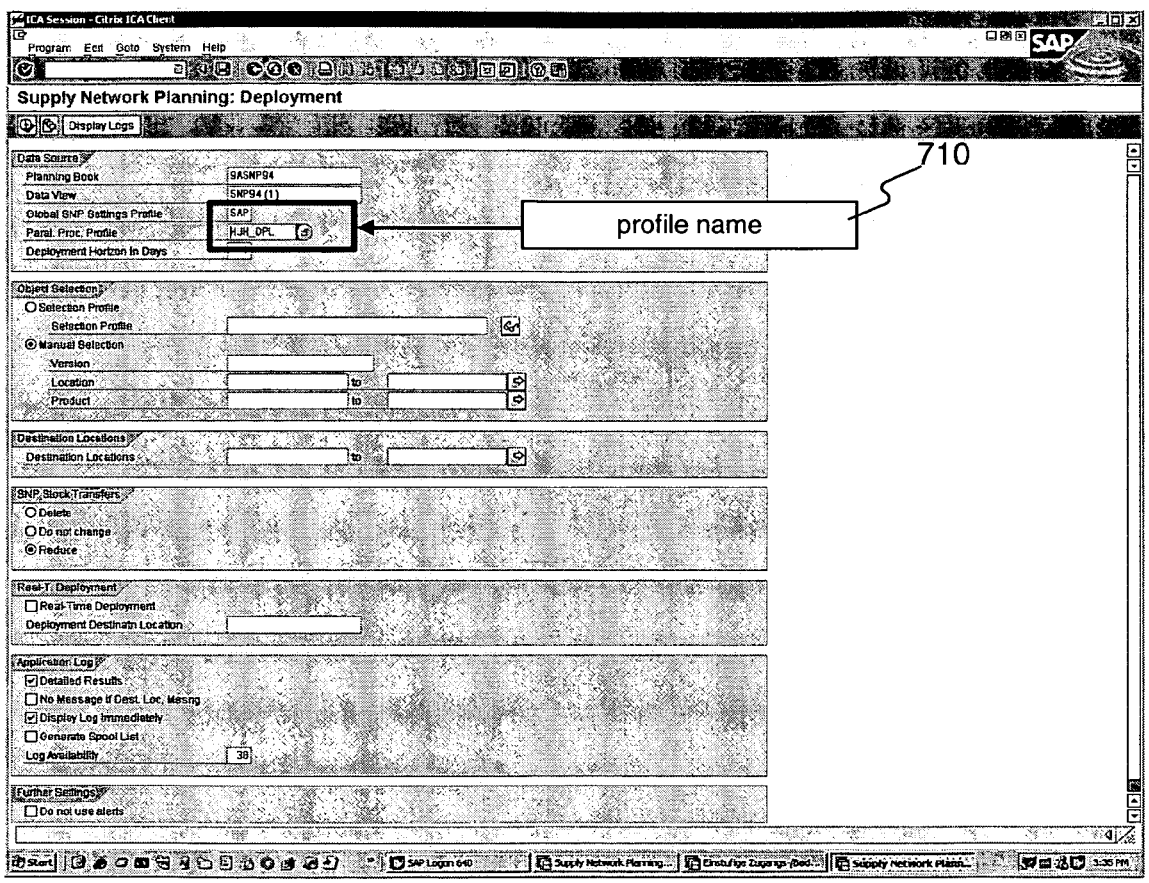
FIG. 7 is an exemplary GUI used to run a parallelization deployment process.

FIG. 7 is an exemplary GUI used to run a parallelization deployment process. To run a parallelization deployment process, one or more user interfaces may be provided. Such an interface may include, for example, entry fields and control buttons for entering information. In one embodiment, a GUI is provided with message prompts, entry fields and/or control buttons to facilitate the running of the parallelization deployment process by a user. Such a GUI may comprise one or more screens or windows to guide a user through the setup of running a parallelization deployment process. Help screens may provide information for the user, and/or drop-down menus or tables may provide lists of predefined services, profiles, or other elements for selection by the user when running a parallelization deployment process. Additionally, or alternatively, a parallelization deployment process may be created using a separate application or program and then stored for later access by the SNP system 300. As shown in FIG. 7, one or more data entry fields may be provided in the GUI to enable a user to specify a PPP. In this case, a PPP may be specified by a user if the user enters a profile name 710. A user may alternatively select a profile name from a pull-down menu.

Figure 8:
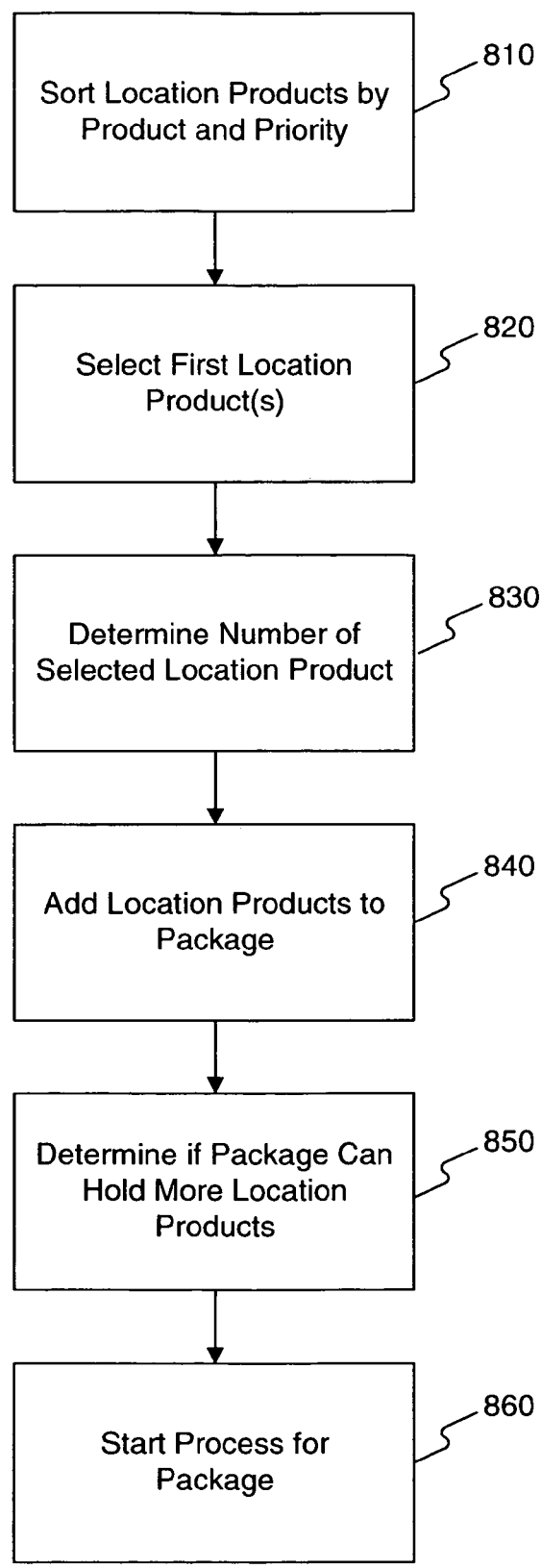
FIG. 8 is a flowchart of an exemplary method of building packages of products for a parallelization deployment process, consistent with an embodiment of the present invention.

FIG. 8 is a flowchart of an exemplary method for building packages of location products for a parallelization deployment process, consistent with an embodiment of the present invention. As shown in FIG. 8, SNP system 300 may first sort all the location products by product name and low level code, (i.e., sequence order), in a products table (stage 810). SNP system 300 may then select the first location product(s) in the products table (stage 820). After the first location product is selected, SNP system 300 may then determine the number of the selected location product(s) (stage 830). SNP system 300 may then add the selected location products to a first package (stage 840), and then determine whether the package can hold any more location products (stage 850). An exemplary process for determining whether a package can hold any more location products will be discussed below with regard to FIGS. 9A-9C. SNP system 300 may then start a deployment process for the current package (stage 860). The deployment process may be implemented consistent with conventional techniques or in a manner similar to the deployment process described in U.S. patent application Ser. No. 11/013,275 filed on Dec. 17, 2004, the entire contents of which are expressly incorporated by reference herein.

Figure 9A:
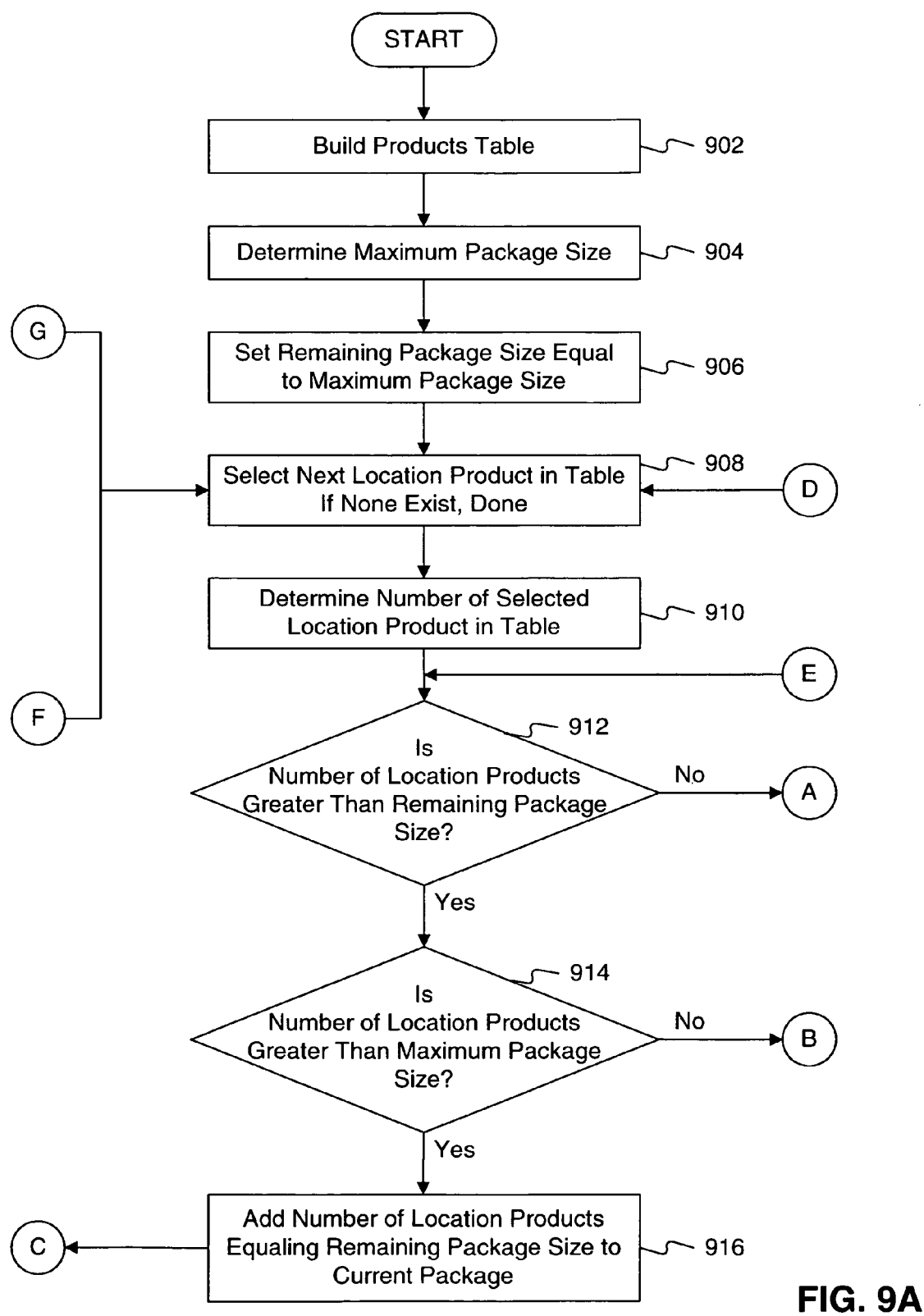
FIGS. 9A-9C are further flowcharts of an exemplary method for building packages of products for a parallelization deployment process, consistent with an embodiment of the present invention.
Figure 9B:
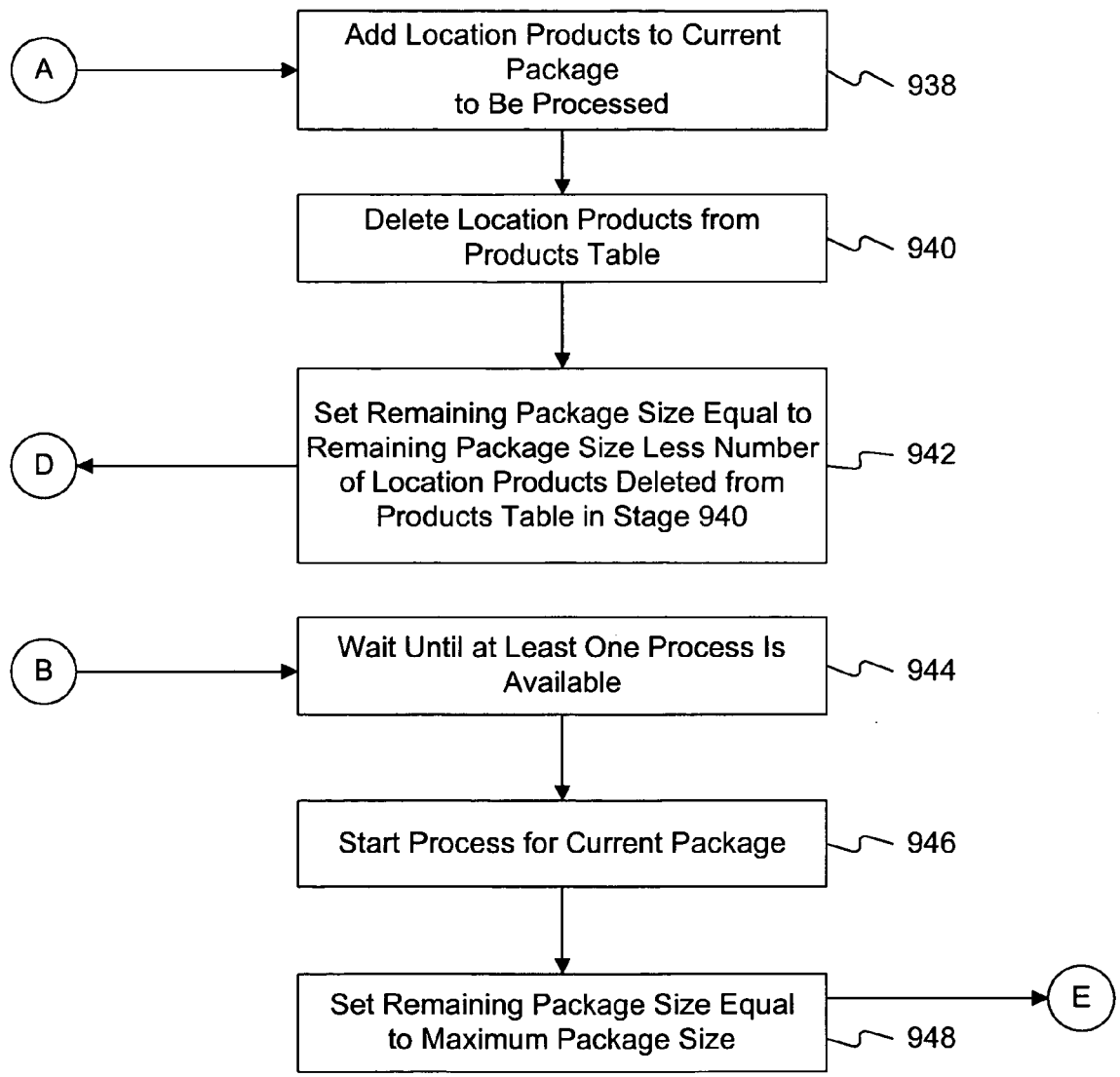
Figure 9C:
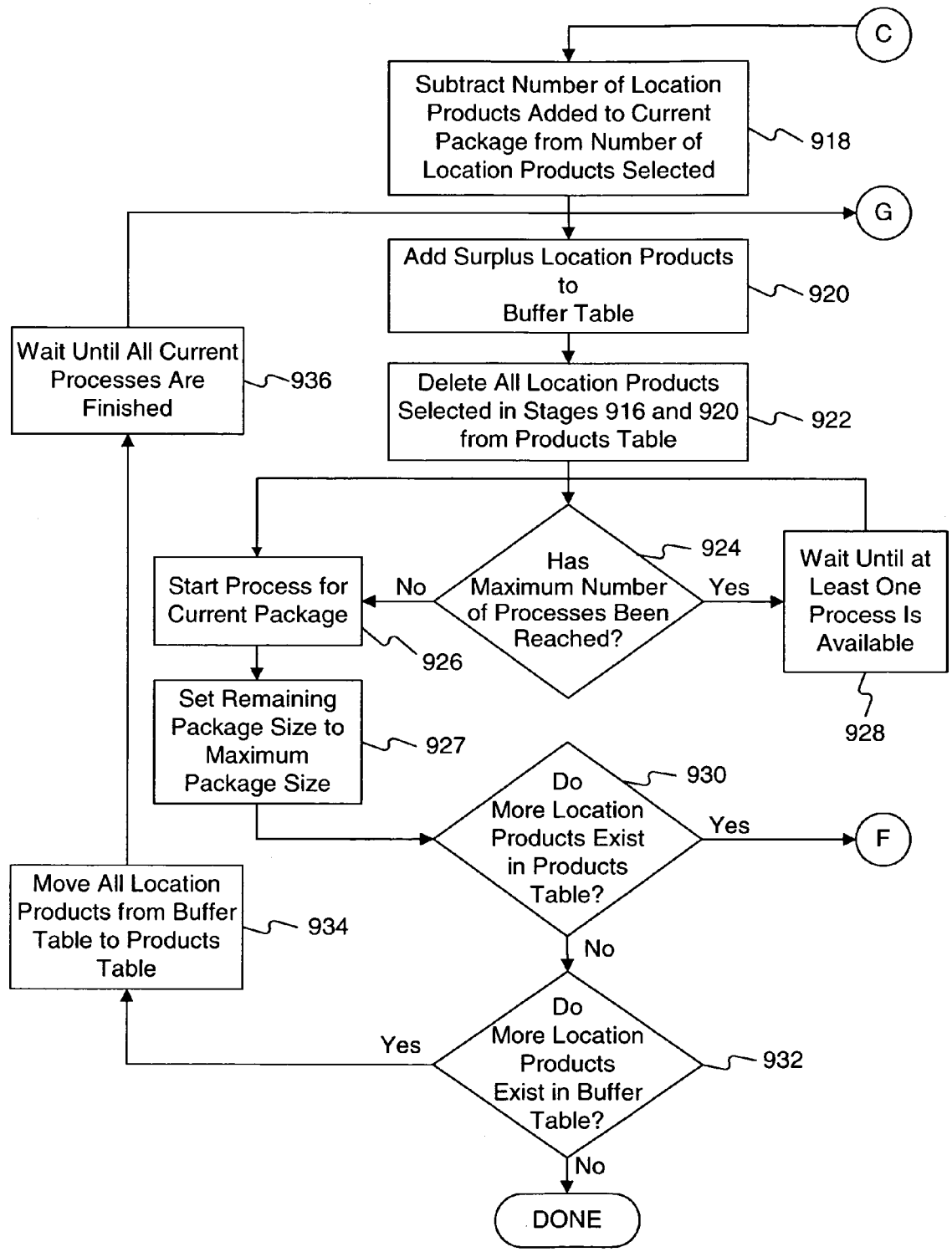

FIGS. 9A-9C are flowcharts of an exemplary method of building packages of location products for a parallelization deployment process, consistent with an embodiment of the present invention. The package building method is described with reference to specific object types (e.g., location product). As will be appreciated by those skilled in the art, these exemplary methods may be adapted for other types of objects and/or otherwise modified.

SNP system 300 may first create an inventory or products table (stage 902), such as that shown in FIG. 10. The products table may include a list of location products that may need to be deployed from one or more source locations to one or more destination locations. The products table may include various information about each location product, such as the location information of each location product within a production plant or distribution center, the location product name, and/or low level code for each location product. The low level code or sequence order information may reflect the importance of the deployment of the particular location product with regard to the other location products in the products table. For example, in the products table of FIG. 10, the location product "MAT1" 1004 is located in "PL1" 1002 and has low level code of "2" 1006. The products table may be sorted by product first, and then the low level code.

Once SNP system 300 has built the products table, SNP system 300 may determine the maximum package size (stage 904) from the PPP (e.g., set in stage 430 of FIG. 4). The maximum package size may represent the maximum number of location products within the products table 1000 that SNP system 300 may group into one package in order to create one distribution plan for each of these location products in one process.

After SNP system 300 determines the maximum package size, SNP system 300 may set the remaining package size to be equal to the maximum package size (stage 906). The remaining package size represents how many additional location products may be added to the current package. The remaining package size and the maximum package size may at any point in the process of FIGS. 9A-9C be the same number. SNP system 300 may then determine the next location product in a products table (stage 908) and determine the number of occurrences of the location product in the products table (stage 910). For example, SNP system 300 may determine there are five occurrences of the "MAT1" product in the products table. Once SNP system 300 determines the number of occurrences of the location product, SNP system 300 may determine whether this number is greater than the remaining package size (stage 912) and, if the number of occurrences is greater, whether this number is also greater than the maximum package size (stage 914).

If SNP system 300 determines that the number of occurrences of this selected location product is greater than the maximum package size, SNP system 300 may then add the number of location products equaling the remaining package size to the current package set for processing (stage 916) and then subtract the number of location products added to the current package from the number of location products selected from the products table (stage 918). The surplus location products may then be added to a buffer table (stage 920). By way of example, the buffer table may be located in storage device 316. Once the surplus location products are added to the buffer table, all of the selected location products, whether they were added to the current package in stage 916 or added to the buffer table in stage 920, are then deleted from the products table (stage 922).

SNP system 300 may then determine whether the maximum number of processes has been reached (stage 924). SNP system 300 may make this determination by referring to the maximum number of parallel processes (e.g., defined in stage 430 of FIG. 4). If the maximum number of processes has not been reached, SNP system 300 may start a deployment process for the current package of location products (stage 926). If the maximum number of processes has been reached (i.e., there are one or more deployment runs totaling the maximum number of processes processing a package at the same time), SNP system 300 may wait until one of the parallel processes has finished, (i.e., the deployment run for at least one of the previous packages has completed) and is available (stage 928), SNP system 300 may start the process for the current package (stage 926) and then set the remaining package size to be equal to the maximum package size (stage 927).

After the process is started for the current package, SNP system 300 may determine whether any more location products exist in the products table (stage 930). If more location products exist in the products table, SNP system 300 may select the next location product in the table (stage 908) and continue through stages 910-930 until no more location products exist in the products table.

If no more location products exist in the products table, SNP system 300 may determine whether any more location products exist in the buffer table (stage 932). If no more location products exist in the buffer table, SNP system 300 has completed packaging all of the location products. If more location products exist in the buffer table, SNP system 300 may then move all of the location products from the buffer table to the products table (stage 934), wait until all of the current processes have completed, and therefore all the deployment runs are finished (stage 936), and then proceed to the next location product in the products table (stage 908). SNP system 300 may then repeat steps 910-932 until no more location products exist in the products and buffer table.

If in stage 912, SNP system 300 determines that the number of location products selected from the products table of a particular location product is not greater than the remaining package size, SNP system 300 may then add these location products to the current package to be processed (stage 938) and delete these added location products from the products table (stage 940). SNP system 300 may then set the current package size to be equal to the current package size less the number of location products deleted from the products table in stage 940 (stage 942). SNP system 300 may then select the next location product in the table (stage 908) and determine the number of the selected location product (stage 910). If the number of the location product is greater than the remaining package size, and SNP system 300 determines that the number of the location product is not greater than the maximum package size (stage 914), SNP system 300 may wait until at least one process is available (stage 944) and start the deployment process for the current package (stage 946). After the process has been started (stage 946), SNP system 300 may then set the remaining package size to be equal to the maximum package size (stage 948) and then continue to stage 912 to determine whether the number of location products is greater than the remaining package size and continue through steps 914-932 until there are no more location products left in the products table.

To further illustrate, FIG. 10 provides a diagram of an exemplary products table. The exemplary table will be described below with reference to the exemplary method of FIGS. 9A-9C, consistent with an embodiment of the present invention. SNP system 300 may first build a products table (see, e.g., FIGS. 6 and 7). The products table may include the location of the location product within the distribution center, the name of the location product, or any low level code (sequence order or priority information) related to the location product. Various types of low level code can be used for each location product. For example, with regard to FIG. 2, the low level code of CU1, at the customer level may be "0," the low level code of both DC1 and DC2, both at the distribution center, may be "1," and the low level code of both PL1 and PL2, at the plant level may be "2." Therefore, location products at the distribution centers DC1 and DC2 may be processed before location products at the plant level, PL1 and PL2. SNP system 300 may then determine the maximum package size from the PPP (see e.g., stage 904 in FIG. 9A). For purposes of an example package size, the maximum package size of three ("3") will be used with reference to the products table in FIG. 10.

At this point, SNP system 300 may set the remaining package size equal to the maximum package size, therefore setting the remaining package size to equal three (stage 906). SNP system 300 may then determine the next location product is "MAT1" 1004 (stage 908) and that there are five "MAT1" location products, 1004, 1010, 1016, 1022, and 1028 in the products table (stage 910). SNP system 300 may determine the remaining package size is three and the number of location products determined in stage 910 is five. Therefore, the number of location products is greater than the current remaining package size (stage 912) and also the number of location products is greater than the maximum package size (stage 914). SNP system 300 may then add the same number of location products as the remaining package size to the current package (stage 916). In determining which of the location products to add to the current package, SNP system 300 may rely on a sequence order (e.g., indicated by a low level code) of each location product. For example, assuming a higher number represents a higher sequence order or priority, SNP 300 may add "MAT1" 1004 and "MAT2" 1010 to the current package, which is "package 1" 1091, because location products "MAT1" 1004 and "MAT1" 1010 both have a low level or priority code of "2." SNP system 300 may also add either location product "MAT1" 1016 to "package 1" 1091 or location product "MAT1" 1022. SNP system 300 may at this point randomly choose a location product because both location products "MAT!" 1016 and "MAT1" 1022 have the same low level code.

After SNP system 300 adds the location products to the current package, SNP system 300 may then subtract the number of location products added to the current package from the number of location products selected (stage 918). SNP system 300 may then add the surplus location products to a buffer table (stage 920). In this example, location products "MAT1" 1022 and "MAT1" 1028, representing the surplus, may be added to a buffer table. The buffer table may be part of a database system located in, e.g., storage device 316. After SNP system 300 adds the surplus location products to a buffer table, SNP system 300 may then delete location products 1004, 1010, 1016, 1022, and 1028 from the table in FIG. 10 (stage 922).

SNP system 300 may determine whether a process is available to carry out a planning algorithm for each of the location products in the current package (stage 924). Again, the maximum number of parallel processes was set by the user in stage 430. In the current example, because no other processes have been started, and the maximum number of processes is three, SNP system 300 may start an automatic parallelization process for the current package, "package 1" 1091 (stage 926). A planning algorithm is carried out for each location product within the "package 1" 1091. The planning algorithm, as discussed above, may create a distribution plan for each of the location products in the current package.

SNP system 300 may then determine that more location products exist in the products table (stage 930) and identify the next location product is "MAT2" 1034 (stage 908). SNP system 300 may determine that the total number of "MAT2" in the products table of FIG. 10 is five, 1034, 1040, 1046, 1052, and 1058 (stage 910). SNP system 300 may determine that the number of "MAT2" location products is greater than the remaining package size, which is still set to three (stage 912) and that the number of location products is also greater than the maximum package size, which is also currently three (stage 914). SNP system 300 may use the sequence order or priority information for each of the "MAT2" location products and add "MAT2" 1034, 1040, and 1046 to the second package (stage 916). SNP system 300 may then subtract the number of "MAT2" location products from the products table 1000 (stage 918), leaving two surplus location products, and add these two surplus location products to the buffer table (stage 920). Therefore, "MAT2" 1052 and 1058 may get added to the buffer table.

Continuing with the process, SNP system 300 may determine whether the maximum number of processes has been reached (stage 924). Currently, in this example, only one process has been started and the maximum number of processes as defined in the PPP is five. SNP system 300 may then start the process for the current package, "package 2" 1092 (stage 926).

SNP system 300 may then determine that more location products exist in the products table 1000 (stage 930) and select the next location product in the table, "MAT3" (stage 908). SNP system 300 may determine there are five "MAT3" location products in the products table 1000 and further determine that the number of "MAT3" location products is greater than the remaining package size (stage 912). For example, the five "MAT3" location products are larger than the remaining package size, which is still set to three. SNP system 300 may further determine that the number of "MAT3" location products is greater than the maximum package size (stage 914), which is also three in this example. SNP system 300 may then add the number of "MAT3" location products equaling the remaining package size to the current package. Therefore, "MAT3" 1064, 1070, and 1076 are added to "package 3" 1093 (stage 916), "MAT3" 1082 and 1088 are added to the buffer table (stages 918 and 920), and all "MAT3" location products are deleted from the products table (stage 922).

At this point, SNP system 300 may determine that the maximum number of processes, two, have already been started (stage 924). Therefore, it may wait until at least one process has finished (stage 928) and then start the process for "package 3" 1093 (stage 926). SNP system 300 may then set the remaining package size equal to "3," the maximum package size (stage 927).

The processing of the products table at this point has finished and the products table of FIG. 10 is empty. Therefore, SNP system 300 may move all the location products from the buffer table (not shown) to the products table (stage 934), wait until all previous processes have finished (stage 936), and select the next location product (stage 908). A new products table, for example, the table shown in FIG. 11, is created once SNP system 300 moves all the location products from the buffer table to the products table. For example, as shown in FIG. 11, there are two "MAT1" location products, 1104 and 1110, in the products table (stage 910). The number of "MAT1" location products is less than the remaining package size "3"(stage 912). Therefore, SNP system 300 may then add these "MAT1" location products to the current package, "package 4" 1137, and delete these location products from the products table 1100 (stage 940). SNP system 300 may set the remaining package size to equal the remaining package size less the number of location products deleted in stage 940. As a result, the remaining package size is set to "1" (stage 942).

SNP system 300 may select the next location product in the products table "MAT2"(stage 908) and determine there are two "MAT2" location products, 1116 and 1122 (stage 910). The number of "MAT2" location products, two, is greater than the remaining package size, one (stage 912), but the number of location products, three, is not greater than the maximum package size, three. Therefore, SNP system 300 may add the current list of location products "MAT2" 1116 and 1122 to the current package, "package 5" 1138. SNP system 300 may then wait until less than two processes are running (stage 944) and then start the process for "package 4" 1137 (stage 946). The remaining package size may then be set to the maximum package size of "3" (stage 948).

SNP system 300 may determine that the number of location products of "MAT2," which is two, is not greater than the remaining package size three (stage 912). Therefore, SNP system 300 may add these "MAT2" location products to the current package, "package 5" 1138, and delete them from the inventory table (stage 940). The remaining package size is then set to equal the remaining package size, which is three, less the number of location products deleted from the products table in stage 940, which is two. As a result, the remaining package size is set to "1" (stage 942).

SNP system 300 may then select the next location product in the table, "MAT3" (stage 908) and determine there are two "MAT3" location products, 1128 and 1134 (stage 910). The number of "MAT3" location products is greater than the remaining package size (stage 912), but the number of "MAT3" location products is not greater than the maximum package size of three. Therefore, SNP system 300 may wait for at least one process to be available, if not already available (stage 944), start the process for the previous package, "package 5" 1138, and then set the remaining package size to equal the maximum package size, which is three. SNP system 300 may then determine that the number of location products of "MAT3," which is two, is greater than the remaining package size three. Therefore, SNP system 300 may add all the "MAT3" location products to the current package, "package 6" 1139 (stage 938), and then delete these location products from the products table (stage 940).

Continuing with the process, SNP system 300 may set the remaining package size to equal the remaining package size minus the number of location products deleted from the products table in stage 940, thereby setting the remaining package size to "1" (stage 942). There are then no more location products in the products table (stage 908) and, therefore, the last process for the last package, "package 6" 1139, is started and the process is finished.

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed:

1. A method for creating a distribution plan for products, the method comprising:
    providing a parallel processing profile associated with distribution plan processes of a plurality of products, the distribution plan processes of the plurality of products being executed in parallel, the parallel processing profile comprising deployment information for creating the distribution plan;
    providing a table for the plurality of products including at least a first product and a second product, wherein;
        the table specifies a first product location associated with the first product and a second product location, distinct from the first product location, associated with the second product; and
        the table further indicates in individual table entries a plurality of occurrences of the first product and a plurality of occurrences of the second product; wherein the occurrences of the first product or the second product indicate numbers of the table entries including the first product or the second product;
    determining a first distribution plan process and a second distribution plan available for processing the first product and the second product in parallel;
    building in parallel a first package within the first distribution plan process and a second package within the second distribution plan process;
        the first package including the first product;
        the second package including the second product;
        the first package being built based on the occurrences of the first product and a first set of priority information; and
        the second package being built based on the occurrences of the second product and a second set of priority information; and
    generating, using a processor, the distribution plan based on the first package and the second package built in parallel according to the parallel processing profile associated with distribution plan processes.

2. The method of claim 1, wherein providing the parallel processing profile further comprises:
    defining a profile name to be associated with the profile:
    setting a deployment application to be associated with the profile;
    setting a maximum number of the distribution plan processes to be associated with the deployment application; and
    setting a maximum package size, wherein the maximum package size is e maximum number of the plurality of products to be grouped in one package.

3. The method of claim 2, wherein providing the parallel processing profile further comprises determining whether the profile is specified prior to creating the distribution plan and whether the profile name is specified by a user of the application.

4. The method of claim 2, wherein building the package further comprises setting a remaining package size, wherein the remaining package size is equal to the maximum package size.

5. The method of claim 4, wherein the table further specifies a first product egory associated with the first product, the method further cornprising:
    determining, based on the first product category, a number indicating the occurrences of the first product the number indicating the occurrences of the first product being to a number of table entries comprising the occurrences of the first product; and
    determining whether the number indicating the occurrences exceeds the remaining package size.

6. The method of claim 5, further comprising
    adding the occurrences of the first product to the package if the number indicating the occurrences is not greater than the remaining package size; and
    deleting the occurrences of the first product from the table.

7. The method of claim 6, further comprising:
    waiting until at least one distribution plan process is available;
    starting the distribution plan process for the package; and
    setting the remaining package size equal to the maximum package size.

8. The method of claim 5, further comprising:
    determining a surplus of products by subtracting the number indicating the occurrences from the remaining package size;
    adding the surplus of products to a buffer table; and
    deleting the surplus of the products from the table.

9. The method of claim 8, further comprising;
    determining whether the first distribution plan process and the second distribution plan process are available by comparing a current number of distribution plan processes with the maximum number of the distribution plan processes.

10. The method of claim 9, further comprising:
    waiting until at least one distribution plan process is available before starting a distribution plan process for the package if the maximum number of distribution plan processes has been reached; and
    setting the remaining package size to the maximum package size.

11. The method of claim 10, further comprising:
    determining whether more products exist in the table; and
    moving the surplus of products from the buffer table to the table when more products exist in the table.

12. The method of claim 11, further comprising:
    waiting until all current distribution plan processes are finished processing; and
    moving to a next product from the one or more products.

13. The method of claim 1, wherein the deployment information comprises at least one of a low level code and a priority code.

14. A distribution system for creating a distribution plan for products, the method comprising:
a processor; and
a memory storing instructions that cause the processor to perform a method comprising:
providing a parallel processing profile associated with distribution plan processes of a plurality of products, the distribution plan processes of the plurality of products being executed in parallel, the parallel processing profile comprising deployment information for creating the distribution plan;
providing a table for the plurality of products including at least a first product and a second product, wherein;
the table specifies a first product location associated with the first product and a second product location, distinct from the first product location, associated with the second product; and
the table further indicates in individual table entries a plurality of occurrences of the first product and a plurality of occurrences of the second product;
wherein the occurrences of the first product or the second product indicate numbers of the table entries including the first product or the second product;
determining a first distribution plan process and a second distribution plan are available for processing the first product and the second product in parallel;
building in parallel a first package within the first distribution plan process and a second package within the second distribution plan process;
the first package including the first product;
the second package including the second product;
the first package being built based on the occurrences of the first product and a first set of priority information; and
the second package being built based on the occurrences of the second product and a second set of priority information; and
generating, using a processor, the distribution plan based on the first package and the second package built in parallel according to the parallel processing profile associated with distribution plan processes.

15. The distribution system according to claim 14, wherein providing the parallel processing profile further comprises:
defining a profile name to be associated with the profile;
setting a deployment application to be associated with the profile;
setting a maximum number of the distribution plan processes to be associated with the application; and
setting a maximum package size, wherein the maximum package size is the maximum number of the plurality of products to be grouped in one package.

16. The distribution system according to claim15, wherein building the package further comprises
setting a remaining package size, wherein the remaining package is equal to the maximum package size.

17. The distribution system according to claim 16, wherein the table further specifies a first product category associated with the first product, wherein the method further comprises:
determining, based on the product category, a number indicating the occurrences of the first product, the number indicating the occurrences of the first product being equal to a number of table entries comprising the occurrences of the first product; and
determining whether the number indicating the occurrences exceeds the remaining package size.

18. The distribution system according to claim 17, wherein the method further comprises:
adding the occurrences of the first product to the package if the number indicating the occurrences is not greater than the remaining package size; and
deleting the occurrences of the first product from the table.

19. The distribution system according to claim 18, wherein the method further comprises:
waiting until at least one distribution plan process is available;
starting the distribution plan process for the package; and
setting the remaining package size equal to the maximum package size.

20. The distribution system according to claim 19, wherein the method further comprises:
determining a surplus of products, wherein the surplus is determined by subtracting the remaining package size from the number indicating the occurrences;
adding the surplus of products to a buffer table; and
deleting the surplus of the products from the table.

21. The distribution system according to claim 20, wherein the method further comprises:
determining whether the maximum number of distribution plan processes has been reached.

22. The distribution system according to claim 21, wherein the method further comprises:
waiting until at least one distribution plan process is available before starting a distribution plan process for the package if the maximum number of distribution plan processes has been reached; and
setting the remaining package size to the maximum package size.

23. The distribution system according to claim 22, wherein the method further comprises:
determining whether more products exist in the table; and
moving the surplus of products from the buffer table to the table when more products exist in the table.

24. The distribution system according to claim 23, wherein the method further comprises:
waiting until all current distribution plan processes are finished processing; and
moving to a next product of the one or more products in the table.

25. The distribution system according to claim 14, wherein the deployment information comprises at least one of a low level code and a priority code.

26. A computer-readable medium which stores a set of instructions which, when executed, perform a method for creating a distribution plan for products, the method comprising:
providing a parallel processing profile associated with distribution plan processes of a plurality of products, the distribution plan processes of the plurality of products being executed in parallel, the parallel processing profile comprising deployment information for creating the distribution plan;
providing a table for the plurality of products including at least a first product and a second product, wherein;
the table specifies a first product location associated with the first product and a second product location, distinct from the first product location, associated with the second product; and
the table further indicates in individual table entries a plurality of occurrences of the first product and a plurality of occurrences of the second product;
wherein the occurrences of the first product or the second product indicate numbers of the table entries including the first product or the second product;

determining a first distribution plan process and a second distribution plan available for processing the first product and the second product in parallel;

building in parallel a first package within the first distribution plan process and a second package within the second distribution plan process;

the first package including the first product;

the second package including the second product;

the first package being built based on the occurrences of the first product and a first set of priority information; and the second package being built based on the occurrences of the second product and a second set of priority information; and generating, using a processor, the distribution plan based on the first package and the second package built in parallel according to the parallel processing profile associated with distribution plan processes.

27. The computer-readable medium of claim 26, wherein providing the parallel processing profile further comprises:

defining a profile name to be associated with the profile;

setting a deployment application to be associated with the profile;

setting a maximum number of the distribution plan processes to be associated with the application; and setting a maximum package size, wherein the maximum package size is the maximum number of the plurality of products to be grouped in one package.

28. The computer-readable medium of claim 27, wherein providing the parallel processing profile further comprises determining whether the profile is specified prior to creating the distribution plan and whether the profile name is specified by a user of the application.

29. The computer-readable medium of claim 27, wherein building the package further comprises setting a remaining package size; wherein the remaining package size is equal to the maximum package size.

30. The computer-readable medium of claim 29, wherein the table further specifies a first product category associated with the first product, wherein the method further comprises:

determining, based on the first product category, a number indicating the occurrences of the first product, the number indicating the occurrences of the first product being equal to a number of table entries comprising the occurrences of the first product; and determining whether the number indicating the occurrences exceeds the remaining package size.

31. The computer-readable medium of claim 30, wherein the method further comprises:

adding the occurrences of the first product to the package if the number indicating the occurrences is not greater than the remaining package size; and deleting the occurrences of the first product from the table.

32. The computer-readable medium of claim 31, wherein the method further comprises:

waiting until at least one distribution plan process is available;

starting the distribution plan process for the package; and setting the remaining package size equal to the maximum package size.

33. The computer-readable medium of claim 32, wherein the method further comprises:

determining a surplus of products, wherein the surplus is determined by subtracting the remaining package size from the number indicating the occurrences;

adding the surplus of products to a buffer table; and deleting the surplus of the products from the table.

34. The computer-readable medium of claim 33, wherein the method further comprises:

determining whether the maximum number of distribution plan processes has been reached.

35. The compute-readable medium of claim 34, wherein the method further comprises:

waiting until at least one distribution plan process is available before starting a distribution plan process for the package if the maximum number of distribution plan processes has been reached; and setting the remaining package size to the maximum package size.

36. The computer-readable medium of claim 35, wherein the method further comprises:

determining whether more products exist in the table; and moving the surplus of products from the buffer table to the table when more products exist in the table.

37. The computer-readable medium of claim 36, wherein the method further comprises:

waiting until all current distribution plan processes are finished processing; and moving to a next product from the one or more products.

38. The computer-readable medium of claim 37, wherein the deployment information comprises at least one of a low level code and a priority code.

* * * * *